C. GREINER.
SODA WATER FOUNTAIN.

No. 182,658.          Patented Sept. 26, 1876.

Witnesses,
Chas. Wahlers.
Otto Hufeland.

Inventor.
Charles Greiner
p.
Van Santvoord & Hauff
Attorneys

UNITED STATES PATENT OFFICE.

CHARLES GREINER, OF NEW YORK, N. Y.

IMPROVEMENT IN SODA-WATER FOUNTAINS.

Specification forming part of Letters Patent No. 182,658, dated September 26, 1876; application filed February 19, 1876.

*To all whom it may concern:*

Be it known that I, CHARLES GREINER, of the city, county, and State of New York, have invented a new and useful Improvement in Fountains for Soda-Water, &c., which improvement is fully set forth in the following specification, reference being had to the accompanying drawing, in which—

Figure 1:
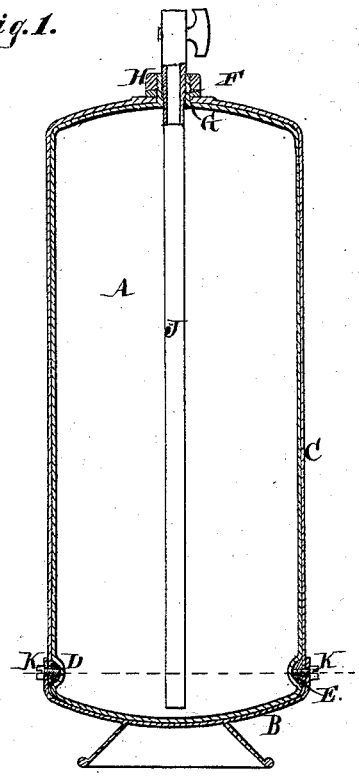
Figure 2:
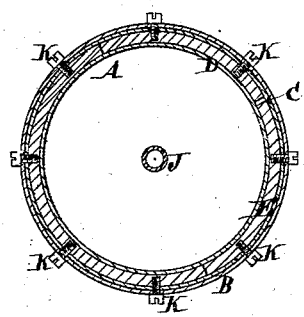

Figure 1 represents a vertical central section. Fig. 2 is a cross-section in the plane of the line $x\, x$, Fig. 1.

Similar letters indicate corresponding parts.

My invention relates to fountains for transporting soda-water and other effervescent liquids having a detachable base and lining; and it consists in a novel means for uniting the base and the lining with the jacket of the fountain, to which end the lining is provided with one or more grooves, in which is placed a collar, flush, or nearly so, with the circumferential surface of the lining, in such a manner that the lining may be slid in or out of the jacket, and that, when the base is put in position, it and the jacket may be fastened to the collar, and thus a firm union of the parts is obtained.

In the drawing, the letter A designates the lining of my fountain. B is the base, and C is the external jacket. The lining A is, preferably, made of block-tin, and at or near its lower end is formed a groove, D. This groove contains a collar, E, which is, by preference, divided into two parts, in order to admit of placing it in the groove, the thickness and form of the collar being such that it is flush, or less that flush, with the circumferential surface of the lining when placed in the groove. This arrangement permits of sliding the lining A in or out of the jacket C, for repairs, or for any other purpose, provided the lining is loose from the other parts of the fountain. When the lining is placed within the jacket C the lower end of the jacket is opposite or beyond the lower side of the groove, or of the collar E, while, when the base B is adjusted in the proper position, its upper terminus is opposite, or nearly so, to the upper side of the groove, so that if screws K, equal in length to the thickness of the jacket, the base, and the collar E, are driven through these parts opposite to and into the collar the parts are firmly united. In order to hold the lining and the jacket C together previous to fastening the base B, the upper part of the lining has a nipple, F, cast or otherwise formed with it, and the jacket C has a hole, G, for the passage of the nipple through it. This nipple F is provided with an external and internal screw-thread, and when the nipple has been passed through the hole G a nut, H, is adjusted on its external thread, whereby the lining and jacket are held together, and a supplemental fastening is formed for these parts. The internal thread of the nipple F serves to confine the discharge-pipe J, which has a corresponding thread at the proper place, so that it may be screwed to the inside of the nipple, and thereby the pipe is firmly held in place.

What I claim as new, and desire to secure by Letters Patent, is—

In a fountain for soda-water and other effervescent liquids, the combination of the lining A, having one or more grooves, D, the collar E, detachable base B, and screws K, for uniting the parts, substantially as described.

In testimony that I claim the foregoing I have hereunto set my hand and seal this 21st day of June, 1875.

CHARLES GREINER. [L. S.]

Witnesses:
W. HAUFF,
CHAS. WAHLERS.